3,259,611
POLYMERIZATION PROCESS FOR VINYLIDENE
CHLORIDE POLYMERS
Edwin D. Hornbaker and George N. Grammer, Baton Rouge, La., assignors to Ethyl Corporation, New York, N.Y., a corporation of Virginia
No Drawing. Filed Feb. 12, 1962, Ser. No. 172,789
14 Claims. (Cl. 260—86.3)

This invention relates to the polymerization of vinylidene chloride, either alone or together with monomers copolymerizable therewith, and to novel catalyst systems which are well suited for the production of high quality polymers of this type.

The successful utilization of the Ziegler catalyst systems (e.g. British Patents 799,392; 799,823; and 801,031) in the preparation of polyolefin polymers is well known. The advantages of this relatively new technology in the production of polyethylene, polypropylene, copolymers of ethylene and propylene and the like are likewise well known.

Unfortunately, however, the Ziegler catalyst systems are not well adapted for the polymerization of vinylidene chloride (1,1-dichloroethylene) or for the formation of copolymers thereof. Attempts to utilize the Ziegler systems for effecting such polymerization result largely in dehydrochlorination of the polymers during their formation. The consequences of such dehydrochlorination are particularly undesirable because this phenomenon is manifested not only in loss of desirable polymer properties but in the distinct discoloration thereof. Frequently polyvinylidene chloride formed by the use of a conventional Ziegler catalyst will exhibit colors ranging from tan to brown. Another difficulty is that when attempts are made to polymerize vinylidene chloride with Ziegler catalysts there is a marked tendency for the polymerization rate to be relatively slow resulting in low yields of polymer per unit time.

There is, therefore, a distinct need in the art for a process by which Ziegler type catalysts may be effectively utilized in the polymerization of vinylidene chloride, either alone or together with monomers copolymerizable therewith, in which the foregoing deficiencies are overcome or at least sharply reduced in severity.

An object of this invention is to fulfill the foregoing need. Another object is to provide a novel process and novel catalytic systems which are substantially free of the difficulties and shortcomings referred to above. A further object is to provide a novel process for the polymerization of vinylidene chloride either alone or together with monomers copolymerizable therewith. Still another object is to provide novel catalysts which are especially adapted for effecting such polymerizations but which may have important utilities in other areas of polymerization technology. Other important objects of this invention will be apparent from the ensuing description.

According to this invention vinylidene chloride is polymerized by contacting the same under polymerization conditions with a novel catalyst system. This catalyst initially consists essentially of (1) An alkyl aluminum compound of the formula $R_xAlH_y$ wherein R is an alkyl group of up to about 8 carbon atoms, $x$ is an integer from 2 to 3, and $y$ is an integer from 0 to 1, $x+y$ being equal to 3;
(2) A metal halide selected from the group consisting of vanadium tetrahalides, molybdenum trihalides and iron trihalides; and
(3) A material (hereinafter sometimes called a modifier) selected from the group consisting of tetrahydrofuran and the lower alkyl derivatives thereof.

It has been found that these 3-component catalyst systems very effectively polymerize vinylidene chloride into higher molecular weight polymers possessing excellent physical properties. Especially noteworthy is the fact that these catalytic systems essentially eliminate the occurrence of the undesirable dehydrochlorination reactions which normally subsist when attempting to utilize conventional Ziegler catalysts in effecting such polymerization. A tangible manifestation of this beneficial result is the observation that the majority of the polyvinylidene chloride polymers produced in accordance with this invention are white although on occasion a yellowish discoloration may exist.

The present catalyst systems give rise to very high conversions of the desired homopolymers and copolymers. In fact, experimental work pertaining to this invention has definitely indicated that it is possible to prepare polyvinylidene chloride in essentially quantitative yield. This is a particularly unique result in that experiments have shown that conventional Ziegler catalysts under the same polymerization conditions produce relatively low yields of polyvinylidene chloride, to say nothing of the poor quality of the polymers so-produced.

The heart of this invention resides in the particular catalyst system employed in polymerizing vinylidene chloride. In other words, the beneficial results discussed above definitely appear to be based on the selective co-action among the several ingredients used in formulating the present catalysts. For example, while methyl acetate has heretofore been suggested as a modifier of certain conventional Ziegler catalysts its use together with an alkyl aluminum compound and a vanadium tetrahalide produced a relatively low yield of polyvinylidene chloride which had undergone an extensive amount of dehydrochlorination. In fact, the polymer was brown.

The first ingredient used in making the present catalysts is the above-described alkyl aluminum compound which is exemplified by trimethyl aluminum, triethyl aluminum, tripropyl aluminum, triisobutyl aluminum, trihexyl aluminum, trioctyl aluminum, diethyl aluminum hydride, diisobutyl aluminum hydride, di-(2-hexyl) aluminum hydride, and the like. Of these, the trialkyl aluminum compounds are preferred from a cost-effectiveness standpoint. Triethyl aluminum has been found to give unusually good results and is therefore particularly preferred.

The second ingredient, the inorganic metal halide salts of vanadium, molybdenum or iron, is preferably a vanadium tetrahalide, a molybdenum trihalide or an iron trihalide. Examples of these materials include vanadium tetrachloride, vanadium tetrafluoride, molybdenum trichloride, molybdenum tribromide, iron trichloride (i.e., ferric chloride), iron tribromide, iron trifluoride, and the like. However, if desired, use may be made of analogous halide salts of the foregoing metals such as the vanadium trihalides (i.e., vanadium trichloride, vanadium tribromide, vanadium trifluoride, vanadium triiodide); the vanadium oxytrihalides (e.g., vanadium oxytrichloride, vanadium oxytribromide, vanadium oxytrifluoride); the molybdenum dihalides (e.g., molybdenum dichloride, molybdenum dibromide); the molybdenumoxytrihalides (e.g., molybdenum oxytrichloride); or the iron dihalides (e.g., ferrous bromide, ferrous chloride); and the like. Preferably all of these materials are utilized in essentially anhydrous conditions, that is, free of any water hydration.

Best results are achieved by the use of vanadium tetrachloride, molybdenum trichloride and ferric chloride, and accordingly, the use of these materials as ingredients in the present catalytic systems is preferred.

The third component—viz. the modifier —is either tetrahydrofuran or a ring alkylated derivative thereof. Of the alkylated tetrahydrofurans it is preferable to use a compound in which the ring contains a lower alkyl group, i.e. an alkyl radical ranging from ethyl up to and including the hexyl radical. From the standpoint of cost and ready availability, tetrahydrofuran itself is preferred. Examples of the alkylated derivatives include the methyl-, ethyl-, propyl-, isopropyl-, butyl-, isobutyl-, sec-butyl-, tert-butyl-, the various amyl-, and the various hexyl-tetrahydrofurans or compounds which possess two of such lower alkyl radicals in the molecule. The principles of this invention do extend and apply, however, to the employment of the higher homologs of the foregoing alkylated tetrahydrofurans.

The ingredients are preferably used in relative amounts such that there are from about 1 to about 5 moles of the alkyl aluminum compound per mole of the inorganic metal halide salt and from about 0.5 to about 3 moles of the modifier per mole of the organoaluminum compound. Significant departures from these proportions may result in a considerable drop off in conversion per unit of polymerization time. Also, be beneficial polymer properties may be impaired by significant departures from these proportions. Particularly good results were obtained when the ratios of organoaluminum compound: inorganic metal halide salt:modifier were about 3:1:3 respectively. Hence these proportions are particularly preferred.

An especially convenient and useful form for these catalyst systems is as a solution in an essentially anhydrous, inert liquid hydrocarbon, notably paraffins, cycloparaffins, and aromatics, illustrative examples of which are given hereinafter.

Particularly good catalyst sytems of this invention are the combinations of triethyl aluminum-vanadium tetrachloride-tetrahydrofuran; triethyl aluminum-molybdenum trichloride-tetrahydrofuran; and triethyl aluminum-ferric chloride-tetrahydrofuran, where the proportions of these are as defined above. The first two of these outstanding catalyst systems just described have been found to give conversions based on vinylidene chloride of well over 70 percent and at the same time produce white polymers. The last-named catalyst system appears to be somewhat more active as it has been found to give essentially quantitative conversions. Under one set of conditions tested this last-named catalyst system did not completely eliminate dehydrochlorination although the extent of this was markedly reduced as compared to conventional Ziegler catalysts.

The order of addition of the several catalyst ingredients does not appear to be particularly critical but best results are achieved by contacting the organoaluminum compound with the modifier prior to the introduction of the inorganic metal halide salt into the catalyst mixture. This, then, constitutes a preferred method of formulating the present catalyst systems.

The process of this invention is well suited for the homopolymerization of vinylidene chloride and also the copolymerization of vinylidene chloride with monomers copolymerizable therewith, especially vinyl chloride, acrylonitrile, methyl acrylate, methyl methacrylate, vinyl formate, vinyl acetate, 4-vinyl pyridine, vinyl ethyl ether, and like vinyl-type polar monomers. This invention is particularly well adapted to the formation of vinylidene chloride polymers in which at least the major proportion (on a molar basis) of the monomer composition is vinylidene chloride. In the copolymer area the adaptation of the present process to the formation of vinylidene chloride-acrylonitrile and vinylidene chloride-vinyl chloride copolymers which contain from about 70 to about 95 mole percent of the vinylidene chloride is especially preferred.

Another advantageous feature of this invention is the fact that conventional low-pressure Ziegler-type polymerization conditions can be and are effectively used in its practice; special polymerization conditions are unnecessary. For example, polymerization temperatures can range from between about 0 to about 100° C. (and preferably between about 35 and about 75° C.). The polymerization can be effected at atmospheric pressure or at relatively mild elevated pressures such as up to about 20 to 30 atmospheres. Catalyst concentrations can range from about 0.001 to about 0.05 mole (based on the inorganic metal halide salt contained in the catalyst mixture) per mole of monomer being polymerized or copolymerized.

As a rule it is advisable to polymerize the vinylidene chloride in the liquid phase. Thus when utilizing temperatures below about 30° C. no special solvent is required, but it can be used if desired. On the other hand, when conducting the present process under the preferred and the higher temperature conditions it is desirable to employ a conventional inert diluent in order to achieve a liquid phase reaction. For this use good results are achieved from liquid paraffinic hydrocarbons (e.g. hexanes, heptanes, octanes, etc.), cycloparaffins (cyclopentanes, cyclohexanes and lower alkylated derivatives thereof), aromatic hydrocarbons (e.g. benzene, toluene, xylenes, etc.), or mixtures of such materials (e.g. petroleum naphthas, petroleum ethers and the like).

Conventional work-up procedures can also be used to recover and purify the polymers produced by the present process. For example, upon completion of the polymerization reaction (on a batch basis polymerization times ranging from about 1 or 2 hours up to about 24 hours or so can be used) the catalyst is generally decomposed by addition to the reaction system of an alcohol such as methanol. The polymer can then be separated from the system (e.g. by filtration, centrifugation, etc.) and thereupon be washed and purified by means of such solvents as methanolic HCl, water, acetone, heptane and/or ether. Conventional drying procedures are also applicable.

The practice and advantages of this invention will be still further apparent from the following illustrative examples which are to be considered as exemplary of this invention and not limitive thereof.

EXAMPLE I

A series of polymerization reactions was carried out in stainless steel pipe bombs each having a capacity of approximately 200 milliliters. The addition of solvents and catalyst components was conducted in an essentially anhydrous nitrogen atmosphere. In each instance the reaction diluent, n-heptane, was first introduced into the bombs followed by triethyl aluminum. Thereupon in some runs either tetrahydrofuran or methyl acetate (a modifier not of this invention) was introduced into the system. Next, an inorganic transition metal halide salt was added. Then, after charging vinylidene chloride into the bombs to a concentration of 5 moles per liter of heptane solvent, the bombs were sealed and rotated for 18 hours in baths maintained at either 60 or 65° C. The catalyst was then destroyed by the addition of methyl alcohol and the polyvinylidene chloride polymer was treated with methyl alcohol and hydrochloric acid and then isolated from the liquids by filtration. After further treatment with methyl alcohol in a rotary blade blending apparatus, the polymer was dried at 50° C. The results of these polymerization runs are summarized in the table.

Table.—*Polymerization of vinylidene chloride—effect of catalyst composition on conversion and polymer properties*

| Run No. | Catalyst System [a] | Polymerization, Temp., °C. | Conversion, percentage of polyvinylidene chloride formed | Appearance of product |
|---|---|---|---|---|
| 1 | Triethyl aluminum-vanadium tetrachloride-tetrahydrofuran.[b] | 65 | 73.2 | White. |
| 2 | Triethyl aluminum-molybdenum trichloride-tetrahydrofuran.[b] | 60 | 78.4 | Do. |
| 3 | Triethyl aluminum-ferric chloride-tetrahydrofuran.[b] | 60 | 100.0 | Yellow. |
| 4 | Triethyl aluminum-vanadium tetrachloride. | 65 | 15.2 | Brown. |
| 5 | Triethyl aluminum-vanadium tetrachloride-methyl acetate.[c] | 65 | 60.0 | Do. |

[a] The triethyl aluminum: transition metal salt molar ratio in each case was 3:1, the vinylidene chloride: transition metal salt ratio being 80:1.
[b] The molar ratio of tetrahydrofuran: triethyl aluminum was 1:1.
[c] The molar ratio of methyl acetate: triethyl aluminum was 1:1.

It will be noted by comparing Runs 1–3, inclusive, with Run 4 that the presence of the tetrahydrofuran pursuant to this invention afforded a very significant increase in conversion and eliminated or essentially eliminated dehydrochlorination. It is to be noted from Run 5 that when methyl acetate was employed in the same fashion as the tetrahydrofuran in Runs 1–3 not only was the conversion significantly lower but the methyl acetate failed to inhibit dehydrochlorination and its deleterious consequences. This demonstrates the selectivity of the catalyst ingredients used per this invention.

EXAMPLE II

The procedure of Example I, Runs 1–3, is repeated except that the monomer charge is composed of 80 mole percent of vinylidene chloride and 20 mole percent of acrylonitrile. Generally similar results are achieved.

EXAMPLE III

The procedure of Runs 1–3 of Example I is repeated utilizing as the monomer charge vinylidene chloride and vinyl chloride in a mole ratio of 85:15 respectively. The same general results are accomplished.

Repetition of the foregoing examples utilizing other catalyst systems of this invention in the manner described herein gives rise to generally similar results.

What is claimed is:

1. A process for the formation of vinylidene chloride polymer in which the monomer charge consists of vinylidene chloride and from 0 to about 30 mole percent of a comonomer selected from the group consisting or acrylonitrile and vinyl chloride which process comprises contacting said monomer charge under polymerization conditions with a catalyst system initially consisting of
   (1) an alkyl aluminum compound of the formula $R_xAlH_y$ wherein R is an alkyl group of up to about 8 carbon atoms, $x$ is an integer from 2 to 3, and $y$ is an integer from 0 to 1, $x+y$ being equal to 3;
   (2) an inorganic metal halide salt selected from the group consisting of vanadium tetrahalide, molybdenum trihalide and iron trihalide; and
   (3) a material selected from the group consisting of tetrahydrofuran and the lower alkylated derivatives thereof;

the relative amounts of the catalyst ingredients being such that there are from about 1 to about 5 moles of (1) per mole of (2) and from about 0.5 to about 3 moles of (3) per mole of (1).

2. The process of claim 1 wherein said alkyl aluminum compound is a trialkyl aluminum compound.

3. The process of claim 1 wherein said alkyl aluminum compound is triethyl aluminum.

4. The process of claim 1 wherein said salt is vanadium tetrachloride.

5. The process of claim 1 wherein said salt is molybdenum trichloride.

6. The process of claim 1 wherein said salt is ferric chloride.

7. The process of claim 1 wherein said material is tetrahydrofuran.

8. The process of claim 1 wherein the molar proportions of said alkyl aluminum compound: said salt: said material is about 3:1:3, respectively.

9. The process of claim 1 wherein said alkyl aluminum compound is triethyl aluminum, said salt is vanadium tetrachloride, and said material is tetrahydrofuran, the mole proportions of these substances being about 3:1:3, respectively.

10. The process of claim 1 wherein said alkyl aluminum compound is triethyl aluminum, said salt is molybdenum trichloride, and said material is tetrahydrofuran, the mole proportions of these substances being about 3:1:3, respectively.

11. The process of claim 1 whereby said alkyl aluminum compound is triethyl aluminum, said salt is ferric chloride, and said material is tetrahydrofuran, the mole proportions of these substances being about 3:1:3, respectively.

12. A process for the formation of vinylidene chloride polymer in which the monomer charge consists of vinylidene chloride and from 0 to about 30 mole percent of a comonomer selected from the group consisting of acrylonitrile and vinyl chloride which process comprises contacting said monomer charge under polymerization conditions with a catalyst system initially consisting of (1) triethyl aluminum (2) vanadium tetrachloride and (3) tetrahydrofuran; the relative amounts of the catalyst ingredients being such that there are from about 1 to about 5 moles of (1) per mole of (2) and from about 0.5 to about 3 moles of (3) per mole of (1).

13. A process for the formation of vinylidene chloride polymer in which the monomer charge consists of vinylidene chloride and from 0 to about 30 mole percent of a comonomer selected from the group consisting of acrylonitrile and vinyl chloride which process comprises contacting said monomer charge under polymerization conditions with a catalyst system initially consisting of (1) triethylaluminum (2) molybdenum trichloride and (3) tetrahydrofuran; the relative amounts of the catalyst ingredients being such that there are from about 1 to about 5 moles of (1) per mole of (2) and from about 0.5 to about 3 moles of (3) per mole of (1).

14. A process for the formation of vinylidene chloride polymer in which the monomer charge consists of vinylidene chloride and from 0 to about 30 mole percent of a comonomer selected from the group consisting of acrylonitrile and vinyl chloride which process comprises contacting said monomer charge under polymerization conditions with a catalyst system initially consisting of (1) triethylaluminum (2) ferric chloride and (3) tetrahydrofuran; the relative amounts of the catalyst ingredients being such that there are from about 1 to about 5 moles of (1) per mole of (2) and from about 0.5 to about 3 moles of (3) per mole of (1).

(References on following page)

References Cited by the Examiner

UNITED STATES PATENTS

| | | | |
|---|---|---|---|
| 2,842,474 | 7/1958 | Pratt | 260—88.1 |
| 2,871,276 | 1/1959 | Eiszner | 260—683.15 |
| 2,882,264 | 4/1959 | Barnes et al. | 260—94.9 |

FOREIGN PATENTS

| | | |
|---|---|---|
| 819,291 | 9/1959 | Great Britain. |
| 834,937 | 5/1960 | Great Britain. |

OTHER REFERENCES

Gaylord: Linear and Steroregular Addition Polymers (p. 98 relied on), Interscience (1959).

JOSEPH L. SCHOFER, *Primary Examiner.*

LOUISE P. QUAST, WILLIAM H. SHORT, JOSEPH R. LIEBERMAN, *Examiners.*

J. F. McNALLY, *Assistant Examiner.*